United States Patent [19]

Rozniecki

[11] Patent Number: 4,621,962
[45] Date of Patent: Nov. 11, 1986

[54] ADJUSTMENT STRUCTURE

[76] Inventor: Edward J. Rozniecki, 31041 Angeline Ct. W, St. Clair Shores, Mich. 48082

[21] Appl. No.: 669,911

[22] Filed: Nov. 9, 1984

[51] Int. Cl.⁴ .............................................. F16B 43/02
[52] U.S. Cl. ...................................... 411/368; 411/539
[58] Field of Search ............... 411/368, 531, 537, 538, 411/539, 546, 398; 248/187; 403/408, 409, 405, 4, 362

[56] References Cited

U.S. PATENT DOCUMENTS

| 1,097,185 | 5/1914 | Oehrle | 411/337 |
| 3,008,368 | 11/1961 | Hammitt | 411/368 |
| 3,158,045 | 11/1964 | Siler | 411/366 X |

FOREIGN PATENT DOCUMENTS

| 940504 | 5/1948 | France | 411/531 |
| 1148367 | 12/1957 | France | 384/26 |
| 191307 | 3/1967 | U.S.S.R. | 403/4 |
| 236909 | 11/1969 | U.S.S.R. | 411/424 |

Primary Examiner—Gary L. Smith
Assistant Examiner—Adrian H. Whitcomb, Jr.
Attorney, Agent, or Firm—Peter A. Taucher; Gail S. Soderling; Robert P. Gibson

[57] ABSTRACT

An adjustment mechanism for adjusting the relative position of at least two parts. A first movable member has two bores formed therein with a frusto-conical portion formed at one end of the bores. A second fixed member has a pair of threaded apertures formed therein. The apertures in the fixed member have a distance between their axes different from the distance between the axes of the bores. Threaded cams are disposed within the bores and apertures so that rotation of the threaded cams causes an adjustment force to be applied to the movable member.

4 Claims, 4 Drawing Figures

ADJUSTMENT STRUCTURE

GOVERNMENT INTEREST

The invention described herein may be manufactured, used, and licensed by or for the Government for governmental purposes without payment to me of any royalty.

BACKGROUND OF THE INVENTION

In one aspect, this invention relates to a structure for adjusting the relative position of two parts. In a further aspect, this invention relates to threaded members used to make adjustments between two parts.

The use of a threaded member to move or adjust parts by anchoring the threaded member in a stationary block or base and attaching the end of the threaded member to the part to be adjusted is well known in the art. One example is a normal vise.

When used to adjust the relative position of two parts, threaded members frequently undergo a slight movement when locked in position, which has to be corrected. For example, when a lock or jam nut is tightened to lock a threaded bolt, the bolt can move an amount equal to the thread play. This will change the adjustment. If the thread play is greater than the allowed error, the adjustment and locking must be repeated. The constant readjustment is time consuming.

It is desirable to have a threaded adjustment system which does not change its position when locked. It is also desirable to have an adjustment structure which can be used to make fine adjustments.

SUMMARY OF THE INVENTION

An adjusting mechanism according to this invention has a first moveable member with cavities extending through the member. The cavities are formed with camming surfaces to be used in making adjustments. A second base member is formed to support the moveable member. The base member has a pair of threaded apertures formed therein in a predefined relationship to the camming surfaces. The threaded apertures are arranged so that their axes have a slightly different spacing than the axes of the cavities.

The adjustment mechanism has a pair of threaded adjustment cams which extend through the cavities in the first adjustable member and are threaded into the threaded apertures of the base member. As the threaded adjustment cams are turned into the threaded apertures, a cam surface on the adjustment cam contacts the cam surface on the cavity. Further insertion of the threaded cam will result in a camming force causing the first adjustable member to move.

DETAILED DESCRIPTION OF THE EMBODIMENTS

Figure 1:
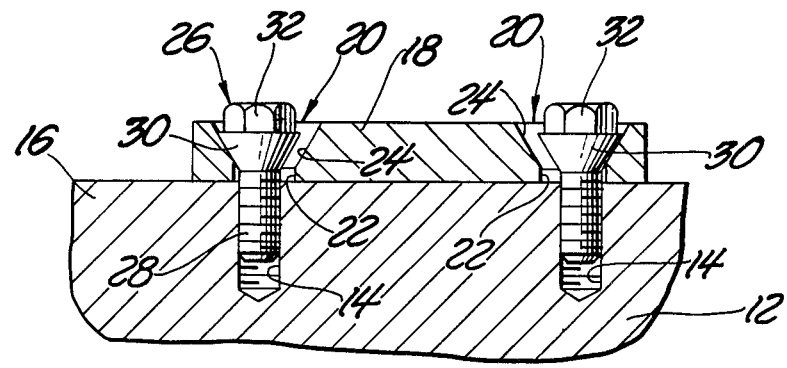
FIG. 1 is a side view in section of a linear adjustment construction of this device.

FIG. 1 of the drawing shows a structure useful for axial adjustment. As shown there is a base member 12 which has two threaded apertures 14. The apertures 14 as shown are formed with their longitudinal axes perpendicular to the upper surface 16.

An adjustable member 18 is disposed on the upper surface 16 of the base member 12. The adjustable member 18 has a pair of cavities 20 formed which extend through the adjustable member. As shown in FIG. 1, the cavities 20 have a reduced cylindrical bore section 22. The reduced cylindrical bores 22 have their longitudinal axes perpendicular to the surface of the adjustable members and parallel to the axes of the threaded apertures 14. The upper portion of the cavities 20 is an inverted frusto-conical opening. The opening has its side formed at an angle to the longitudinal axis. The sides of the frusto-conical openings form a camming surface 24 in the upper portion of the cavities 20 of the cylindrical bore 22. When a cam applies pressure to the camming surface 24, there is a force component which will tend to force the adjustable member 18 axially parallel to the base surface 16 or plate. The cavities 20 as shown in FIG. 1 have their axes separated by a distance slightly less than the distance between the threaded apertures 14.

A pair of threaded adjustment cams 26 are mounted in the apertures 14 and cavities 20. The adjustment cams 26 have a threaded lower portion 28 which extends into and mates with the threaded apertures 14. Each of the adjustable cams 26 has a flared cam portion 30 formed above the threaded portion which is formed with its enlarged portion away from the base member so that as the threaded portion screws into the threaded apertures, the flared cam portion will contact the cam surface exerting a force on the cam surface 24. As shown in FIG. 1, the axes of the cavities are disposed so the distance between their axes is less than the distance between the axes of the threaded apertures. Therefore, the flared cam portion rides against the outer surface of the cavity causing an outwardly acting force on each of the cavities. Drive means 32, hexagonal heads are shown, can be used to move the threaded cams 26 in and out of the threaded apertures.

In the configuration shown in FIG. 1, if the adjustable member 18 is to be moved to the left, the threaded cam at the right of the drawing could be tightened and the threaded cam at the left of the drawing loosened. The resulting leftward force would force and hold the member 18 in the desired position. After the adjustable or moveable member 18 is in the desired position, the threaded cams can be lock-wired using normal lock-wire techniques.

Figure 2:
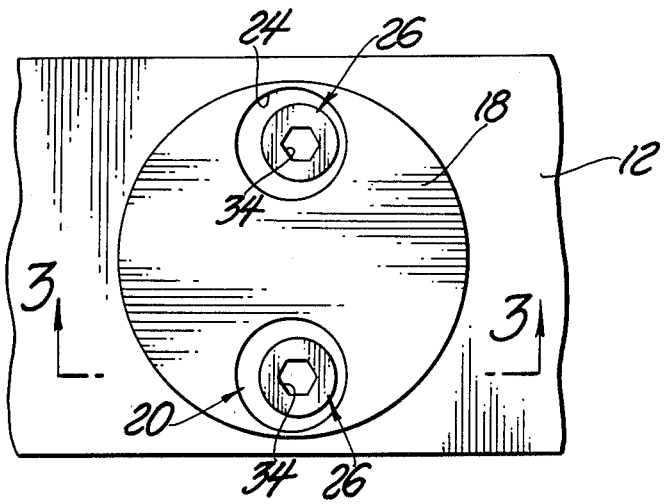
FIG. 2 is a top view of another embodiment of this device for rotational adjustment.
Figure 3:
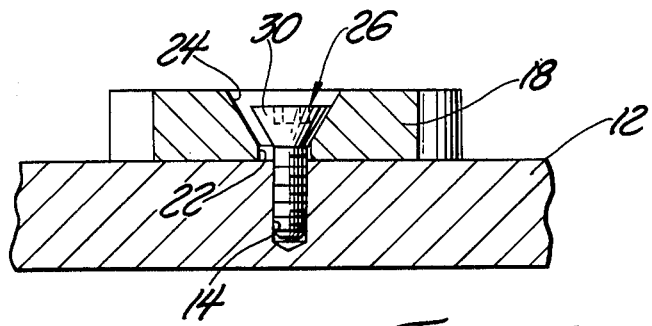
FIG. 3 is a sectional view taken along the line 3—3 of FIG. 2.

FIGS. 2 and 3 show an adjustment structure for rotary adjustment. In these figures, the base member 12 has the adjustable member 18 which is to be adjusted. The base has a pair of threaded apertures 14 formed for mounting the threaded cam members 26. The adjustable member 18 is formed with a pair of cavities 20 formed as described with respect to FIG. 1. As shown, the axes of the cavities 20 are located on the centerline of the moveable member 18 about which the adjustable member is to be rotated. The axes of the threaded apertures 14 lie on a line slightly offset but parallel to the centerline of the moveable member. In FIG. 2, the threaded apertures are offset to the right but lie on the diameter of a circle concentric with the circle diameter passing through the axes of cavities 20. When the threaded cams are rotated as described before, the moveable member will rotate slightly about its center.

As a modification of the rotary design, the threaded apertures 14 axes and the cavities 20 axes could be non-concentric. In this case, the rotation of adjustable member 14 would be eccentric during adjustment.

Figure 4:
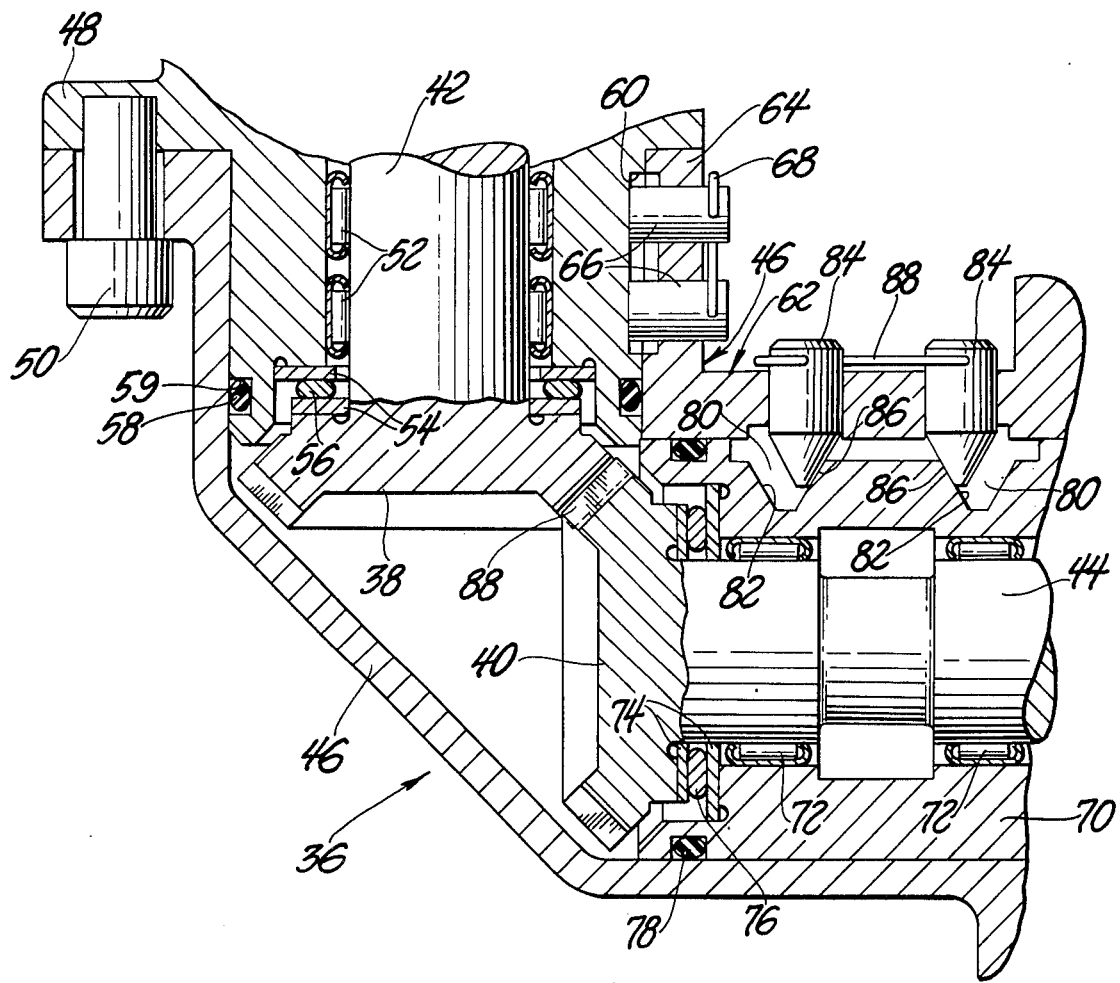
FIG. 4 is a side view in section of an adjustment device of this invention applied to a gear drive mechanism.

FIG. 4 shows an adjustment system of this invention in a substantially different environment. In the structure of FIG. 4, an adjustment structure of this invention is used to adjust the mesh of bevel gear set 36. Zero or nearly zero backlash in gear trains such as transmissions is important to minimize gear tooth wear and prevent gear tooth mismatch. Also after the gear train has been used for a period of time the structure of this invention allows easy readjustment of the structure.

As shown, FIG. 4 is a partial cross sectional view through a bevel gear set having a first bevel gear 38, and a second bevel gear 40 which are mounted on complimentary shafts 42 and 44. One of the shafts would be connected to a source of power and the other shaft would be connected to a driven structure such as a wheel.

The gears are mounted in a transfer case 46. The transfer case 46 is in turn attached at one end to a housing 48 by means of a threaded bolt 50. The other end of the transfer case 46 is attached to a second housing by means not shown. The manner of attaching the transfer case and housings is old in the art and further detail is omitted in the interest of brevity.

The shaft 42 is mounted within the housing 48 and has a pair of annular needle bearings 52 supporting the shaft axially within the housing 48. The end of shaft 42 has a pair of thrust washers 54 mounted between the gear 38 and housing 48. The thrust washers 54 have a needle thrust bearing 56 mounted between them. An O-ring seal 58 is disposed in a groove 59 between the transfer case 46 and the housing 48 to retain the lubricant which is commonly used to fill the transfer case.

The housing 48 has a cavity 60 formed on the inner side of the angle formed by the junction of the two gears 38,40. An L-shaped portion 62 is formed on housing 48 at the interior angle of the gear system with one arm 64 mounted in the cavity 60 formed between the flats machined in housing 48 and transfer case 46. A pair of round point set screws 66 are mounted in the arm 64 of transfer case 46 and when tightened they will hold the transfer case 46 and housing 48 and the other housing components in position. When the set screws 66 have been adjusted, they can be locked in place using a lock-wire 68 to prevent rotation and loss of adjustment.

The other drive shaft 44 is mounted in a second housing 70 using needle bearings 72 and thrust washers 74 in the same fashion as used to mount the shaft 42. A needle thrust bearing 76 is disposed between the thrust washer 72 and an O-ring seal 78 is used to seal the transfer case 46 and second housing 70.

The second housing 70 has a pair of frusto-conical cavities 80 formed in the exterior surface. The cavities 80 form conical cam surfaces 82 in the housing 70. A corresponding pair of threaded adjustment cams 84 are threaded into the L-shaped insert 62 of transfer case 46. The axes of the threaded cams 84 are parallel to each other and to the conical axes of the frusto-conical cavities 80. The distance between the threaded cams 84 axes is less than the distance between the frusto-conical axes so that the threaded cam's lower conical cam portion 86 rides against the cam surface 82. When the adjustable cams 84 have been adjusted, they can be lock-wired using lock-wire 88 to prevent rotation of the threaded cams.

The radial needle bearings 72 are separated by a larger gap than the radial needle bearings 52 to allow room for the adjustment mechanism.

The adjustment of a gear train as shown in FIG. 4 is relatively simple when it is equipped with the adjustment device of this invention. First the gear train and the housing members are assembled and the fasteners, such as fastener 50 tightened to a finger tight position and the set screws 66 are also tightened to a finger tight condition. Then shaft 42 is restrained and a torque applied to shaft 44. The gear separating forces will remove the radial play between needle bearings 52, shaft 44, housing and transfer case 46. The threaded fasteners, 50, are torqued to their operating torque and set screws 66 are tightened to the proper torque. With torque still applied to the gear set, the threaded cams 84 are then rotated so as to move gear 40 longitudinally until there is a zero backlash condition at the gear interface 88 where the gear teeth mesh. The separating force between cavity 80 and cam surface 86 moves the housing 70 eliminating the clearances between bearings, shaft and housing components in the same manner as the set screws 66. The threaded cams 84 can then be wrenched to the proper torque and threaded cams 84 lock-wired to prevent the threaded cams from rotating.

FIG. 4 shows that the adjustment device of this invention can be used in gear systems to achieve alignment as well as simple rotational or axial alignment, as desired in spur gears, helical, hypoid and similar gear sets.

I wish it to be understood that I do not desire to be limited to the exact details of construction shown and described for obvious modifications will occur to a person skilled in the art, without departing from the spirit and scope of the appended claims.

What is claimed is:

1. An adjustment mechanism for adjusting the relative positions of two or more parts comprising: a first movable member having two cavities formed in its surface, the cavities being formed with a bore extending perpendicularly through the first member and an inverted frusto-conical portion formed at one end of the bore, the frusto-conical portion forming a camming surface; a second fixed base member mounted in contact with the surface of the first member containing the bores, the fixed member having two threaded apertures extending through the fixed member the distance between the longitudinal axes of the threaded apertures being different from the distance between the longitudinal axes of the cavities; and two single piece threaded adjustment cams, the adjustment cams having a driving attachment at one end, a threaded portion and an angled cam portion, the threaded cams having the threaded portion disposed in the threaded apertures with the angled cam portion in contact with the cam surfaces of the frusto-conical portion so that advancing one of said cams and retracting the other cam will cause an axial movement in said first member.

2. The adjustment mechanism of claim 1 wherein the cam portion of the threaded cam is interposed between the driving attachment and the threaded portion, the cam surface having a solid frusto-conical shape similar to but smaller than the frusto-conical bore so that it makes contact with the bore along a line.

3. The adjustment mechanism of claim 1 wherein the threaded adjustment cam has means for preventing rotation of the adjustment cam once the parts have been adjusted to their final position.

4. The adjustment mechanism of claim 1 wherein the cam portion of the threaded cam is formed on one end of the threaded cam and the driving means is formed on the other end of the threaded cam.

* * * * *